United States Patent
Boigegrain et al.

(10) Patent No.: US 8,444,494 B2
(45) Date of Patent: May 21, 2013

(54) TRANSMISSION INPUT SHAFT BLADE

(75) Inventors: Larry Boigegrain, Wooster, OH (US); Patrick Lindemann, Wooster, OH (US)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 68 days.

(21) Appl. No.: 13/090,634

(22) Filed: Apr. 20, 2011

(65) Prior Publication Data

US 2011/0263341 A1    Oct. 27, 2011

Related U.S. Application Data

(60) Provisional application No. 61/326,276, filed on Apr. 21, 2010.

(51) Int. Cl.
*F16C 3/00* (2006.01)

(52) U.S. Cl.
USPC .............................................. 464/7; 137/142

(58) Field of Classification Search
USPC ........ 464/7, 183; 192/3.28; 60/330; 137/142, 137/152, 561 A; 184/85
See application file for complete search history.

(56) References Cited

U.S. PATENT DOCUMENTS

| | | | |
|---|---|---|---|
| 2,902,951 A * | 9/1959 | Maag | |
| 4,538,435 A * | 9/1985 | Romero | |
| 4,951,467 A | 8/1990 | Walsh et al. | |
| 5,071,390 A * | 12/1991 | Latshaw | 464/7 |
| 5,575,363 A | 11/1996 | Dehrmann et al. | |
| 5,718,847 A * | 2/1998 | Koble, Jr. | 137/142 X |
| 6,540,053 B2 | 4/2003 | Sasse | |
| 2004/0172936 A1 | 9/2004 | Mueller et al. | |

* cited by examiner

*Primary Examiner* — Gregory Binda
(74) *Attorney, Agent, or Firm* — Kevin L. Parks

(57) ABSTRACT

A flat blade for a transmission input shaft includes a substantially rectangular body portion for insertion in a center bore of the input shaft and at least one radial blade segment extending from the body portion. The radial blade segment is arranged for assembly proximate a distal end of the input shaft and for extending radially beyond the center bore. In an example embodiment, the radial blade segment is substantially rectangular in shape. In an example embodiment, the radial blade segment is a pair of radial blade segments extending in opposing directions. In an example embodiment, the body portion is arranged for press-fitting into the center bore.

9 Claims, 6 Drawing Sheets

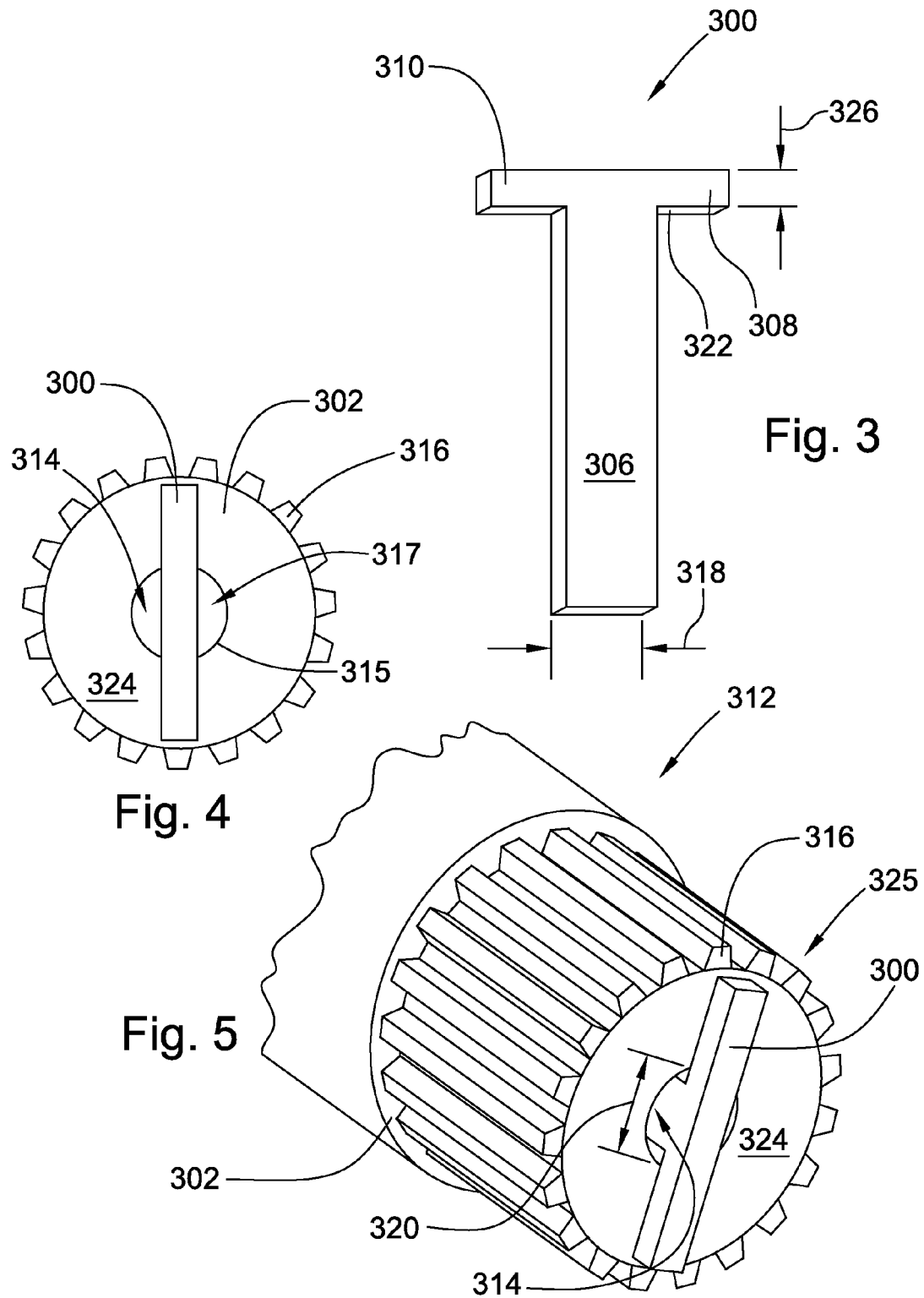

US 8,444,494 B2

TRANSMISSION INPUT SHAFT BLADE

CROSS-REFERENCE TO RELATED APPLICATIONS

This application claims the benefit under 35 U.S.C. §119 (e) of U.S. Provisional Application No. 61/326,276, filed Apr. 21, 2010.

FIELD

The invention relates generally to an input shaft for an automatic transmission, and more specifically to an input shaft with a flow blade.

BACKGROUND

Torque converter rotation introduces an impediment to the free flow of fluid in the area of the housing hub. Devices to eliminate the impediment are known. One example is shown in U.S. Pat. No. 6,540,053 to Sasse. Sasse describes a U-shaped partition element fixed in position on the housing hub area, resting essentially completely against an inside surface of the housing hub area. Similarly, U.S. Pat. No. 5,575,363 to Dehrmann et al. describes a plug on a driven shaft acting as a closure on its axial end and including recesses forming nozzle-shaped inlets which lead into a longitudinal hole of the driven shaft.

BRIEF SUMMARY

Example aspects broadly comprise a flat blade for a transmission input shaft including a substantially rectangular body portion for insertion in a center bore of the input shaft and at least one radial blade segment extending from the body portion. The radial blade segment is arranged for assembly proximate a distal end of the input shaft and for extending radially beyond the center bore. In an example embodiment, the radial blade segment is substantially rectangular in shape. In an example embodiment, the radial blade segment is a pair of radial blade segments extending in opposing directions. In an example embodiment, the body portion is arranged for press-fitting into the center bore.

Other example aspects broadly comprise an input shaft assembly for a transmission including an input shaft with a cylindrical portion having a center bore and a distal end. The assembly also includes a flat blade having a body portion disposed in the center bore and at least one radial blade segment proximate the distal end and extending radially beyond the center bore. In an example embodiment, the radial segment is in contact with the distal end. In an example embodiment, the center bore includes an inner circumferential surface and the input shaft assembly has at least one space between the body portion and the inner circumferential surface.

In an example embodiment, the body portion includes a substantially rectangular shape and is press-fitted into the center bore. In an example embodiment, the at least one radial blade segment extends from the body portion. In some example embodiments, the at least one radial blade segment is substantially rectangular in shape and includes a radial surface. In an example embodiment, the input shaft includes a radial face at a distal end of the cylindrical portion and the radial surface is disposed proximate the radial face.

In an example embodiment, the flat blade includes a distal end and the at least one radial blade segment includes an axial width. The axial width is selected to minimize an axial clearance between the distal end of the blade and a radial wall of a torque converter when the input shaft is installed in a transmission attached to an engine. In an example embodiment, the at least one radial blade segment includes a distal end disposed opposite the distal end of the input shaft. An axial width of the at least one radial blade segment is selected to minimize an axial clearance between the distal end of the blade and a radial wall of a torque converter.

BRIEF DESCRIPTION OF THE DRAWINGS

The nature and mode of operation of the present invention will now be more fully described in the following detailed description taken with the accompanying drawing figures, in which:

FIG. 3 is a perspective view of a blade for a transmission input shaft according to an example aspect;

FIG. 4 is an end view of the blade of FIG. 3 disposed in a transmission input shaft according to an example aspect;

FIG. 5 is a partial perspective view of a transmission input shaft including the blade of FIG. 3 according to an example aspect;

DETAILED DESCRIPTION

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing, the following example methods, devices, and materials are now described.

Figure 1A:
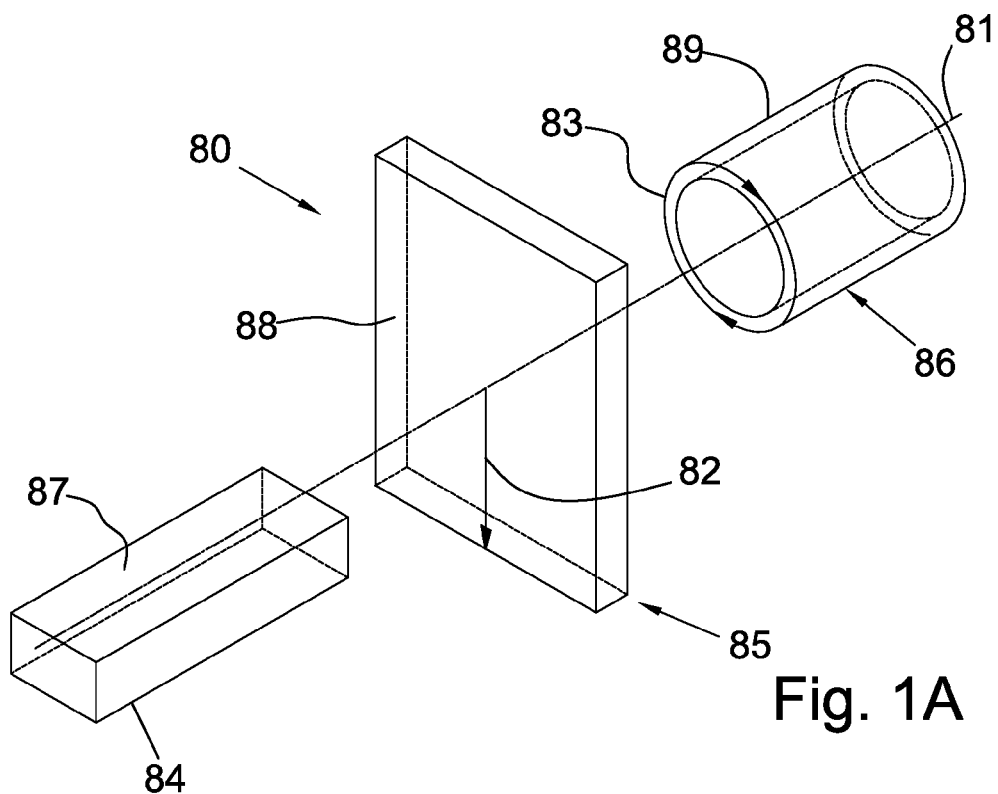
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
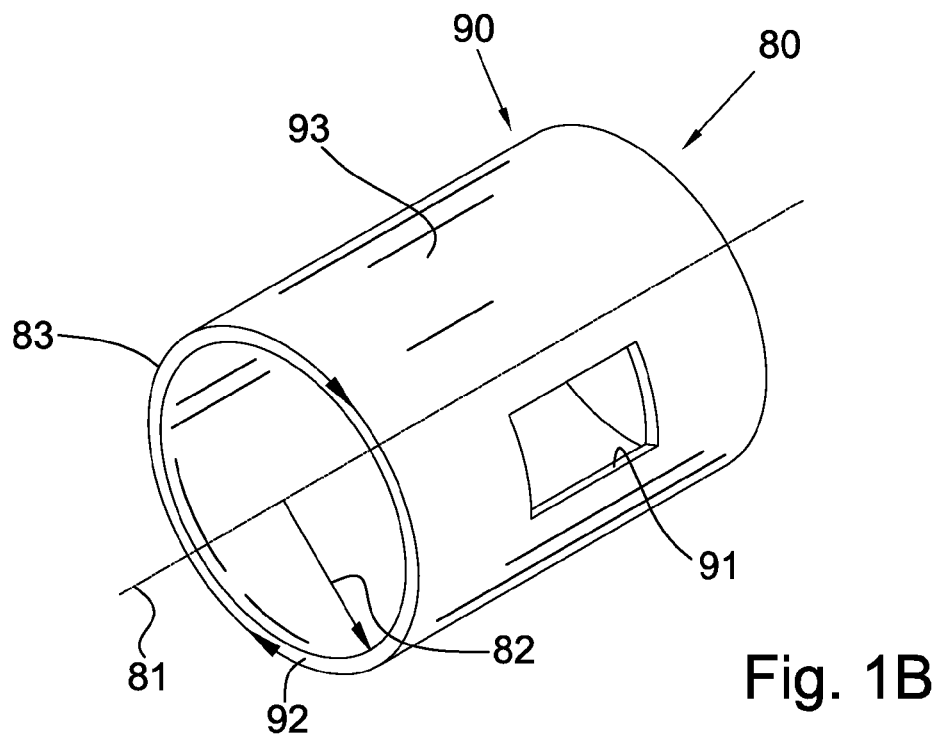
FIG. 1B is a perspective view of an object in the cylindrical coordinate system of FIG. 1A demonstrating spatial terminology used in the present application.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is part of a circumferential plane.

Figure 2:
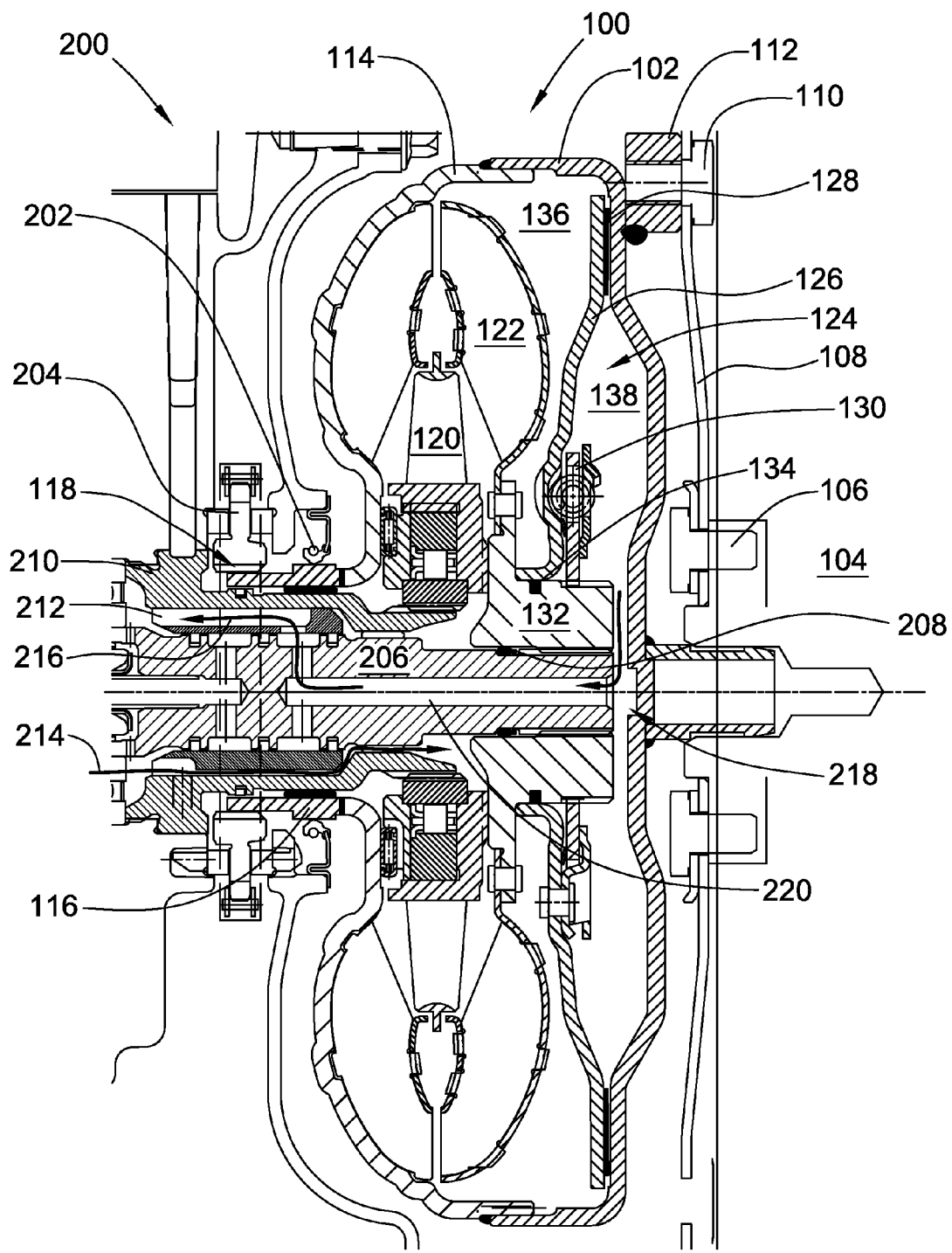
FIG. 2 is a cross-sectional view of a torque converter installed in a prior art transmission.

The following description is made with reference to FIG. 2. FIG. 2 is a cross-sectional view of torque converter 100 installed in prior art transmission 200. Torque converter 100 includes cover assembly 102 attached to engine crankshaft 104. Crankshaft bolts 106 are engaged with flexplate 108 which is fixed to cover 102 with bolts 110 installed in lugs 112. Impeller 114 includes hub 116 sealed to transmission 200 at seal 202. Hub 116 includes drive portion 118 engaged with transmission pump sprocket 204 for driving an off-axis transmission pump (not shown) to provide pressurized fluid flow throughout transmission 200.

Torque converter 100 further includes stator assembly 120, turbine assembly 122 and lockup clutch assembly 124. Clutch assembly 124 includes piston plate 126 with friction material 128, and damper 130. During a lockup mode, torque is transferred from cover 102 to piston 126 through friction material 128 and to damper 130. Output of damper 130 is connected to input shaft 206 through turbine hub 132. Hub 132 is sealed to piston plate 126 at seal 134, and to transmission input shaft 206 at seal 208.

Transmission 200 includes stator shaft 210 and sleeve 212. Sleeve 212 is disposed radially between shafts 206 and 210 and divides flow channels 214 and 216. During lockup mode, oil is pumped from the transmission oil pump (not shown) through input channel 214 into torque converter 100 and evacuated through output channel 216 back to the transmission sump. Piston plate 126 is adjusted by a pressure difference in channels 214 and 216. That is, when pressure is higher in channel 214, piston plate 126 is urged in direction of cover 102 to engage the clutch. When pressure is higher in channel 216, the clutch is disengaged.

Friction material 128 forms a seal to separate input chamber 136 from output chamber 138. Chambers 136 and 138 are in fluid communication with respective channels 214 and 216. In some applications, friction material 128 may be porous or have grooves, or piston plate 126 may include an orifice, to ensure circulation of fluid through torque converter 100 during lockup mode. Fluid circulation helps cool converter 100 by removing heat generated during periods of clutch slip. Fluid passing through piston 126 and/or friction material 128 must enter channel 216 through gap area 218 between input shaft 206 and cover 102. Torque converter rotation introduces an impediment to fluid flow in area 218 during periods of clutch slip. That is, fluid rotational speed tends to increase as fluid travels radially inward so that fluid rotational speed is high at gap area 218 making it difficult to guide fluid into bore 220 of input shaft 206. Reduced flow in area 218 creates back pressure in chamber 138 and reduces the torque capacity of the clutch.

Figure 6:
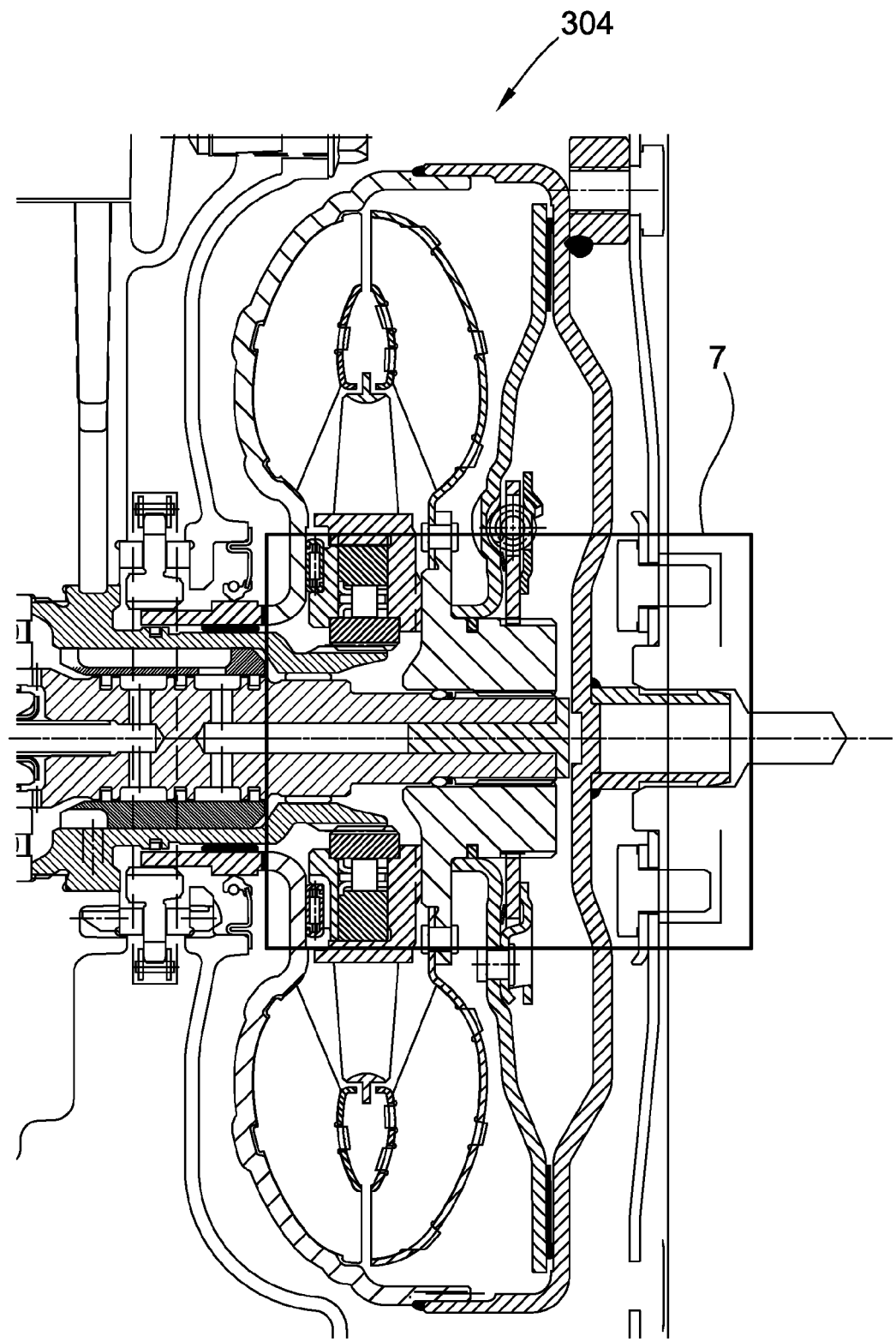
FIG. 6 is a cross sectional view of a torque converter installed on an input shaft including the blade of FIG. 3, according to an example aspect.
Figure 7:
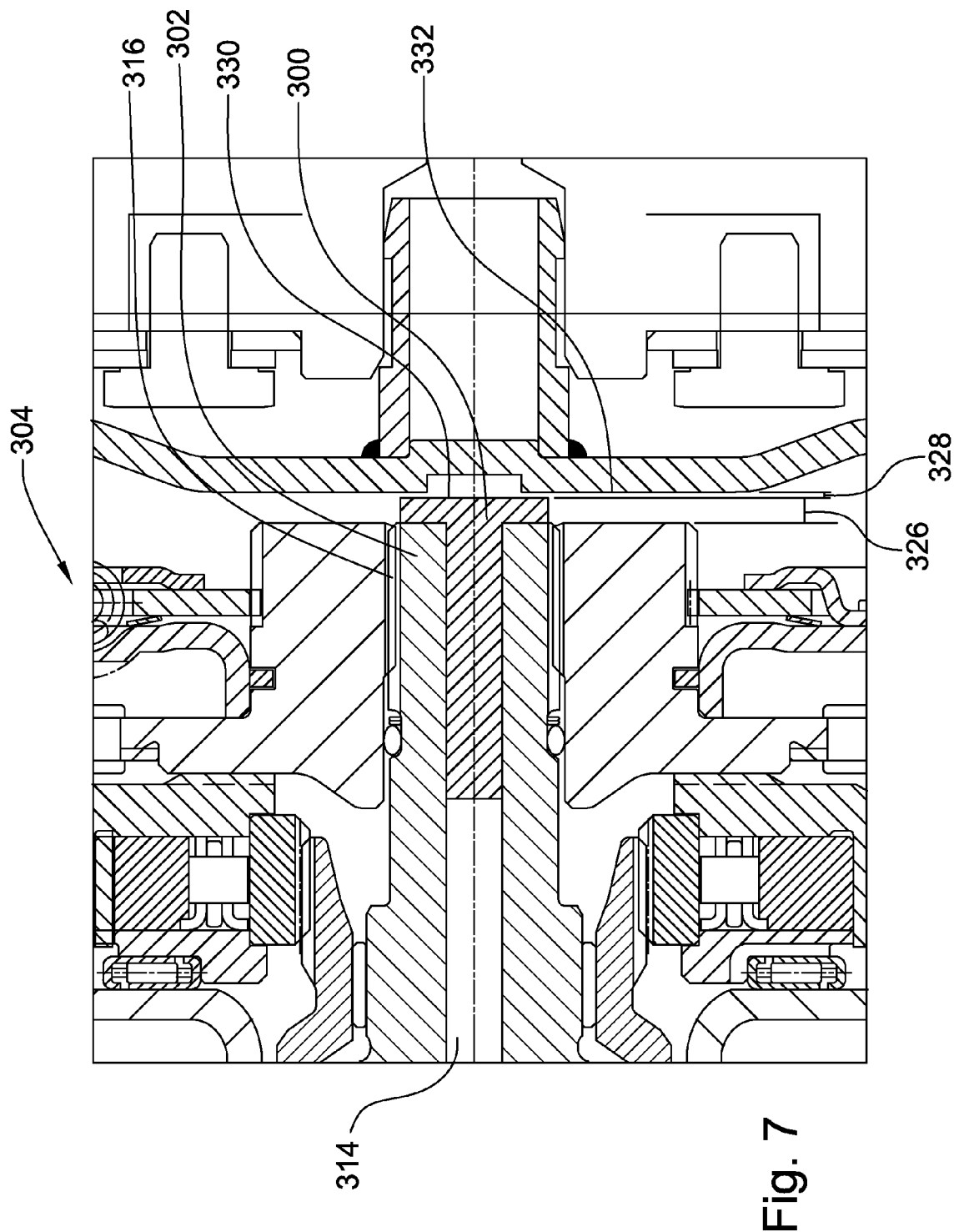
FIG. 7 is a detail view of boxed region 7 in FIG. 6.

The following description is made with reference to FIGS. 3-7. FIG. 3 is a perspective view of blade 300 for a transmission input shaft according to an example aspect. FIG. 4 is an end view of blade 300 of FIG. 3 disposed in transmission input shaft 302 according to an example aspect. FIG. 5 is a partial perspective view of transmission input shaft 302 including blade 300 of FIG. 3 according to an example aspect. FIG. 6 is a cross sectional view of torque converter 304 installed on input shaft 302 including blade 300 of FIG. 3, according to an example aspect. FIG. 7 is a detail view of boxed region 7 in FIG. 6.

Blade 300 includes body portion 306. In some example embodiments, body portion 306 is substantially rectangular in shape. Blade 300 also includes radial blade, or radial blade segment, 308 extending from body portion 306. In some example embodiments, radial blade 308 is substantially rectangular in shape. In an example embodiment, blade 300 may further include radial blade, or radial blade segment, 310. That is, blade 300 includes a pair of radial blades extending in opposing directions. In an example embodiment, body portion 306 is arranged for press-fitting into a center bore of the transmission input shaft as discussed below.

Input shaft 302 includes cylindrical portion 312 with center bore 314. Center bore 314 includes inner circumferential surface 315. In an example embodiment, cylindrical portion 312 includes spline 316 for engaging a mating spline on a turbine hub. Shaft 302 further includes blade 300 disposed in center bore 314. Blade 300 may be press-fitted into bore 314. That is, width 318 of body portion 306 is slightly larger than diameter 320 of bore 314 such that blade 300 must be forced into bore 314 creating a tight connection, or press-fit. Friction between blade 300 and bore 314 rotates blade 300 with input shaft 302.

As noted above, blade 300 includes radial blade 308. In an example embodiment, radial blade 308 includes radial surface 322. Input shaft 302 includes radial face 324 at distal end 325 of cylindrical portion 312. In an example embodiment, radial blade radial surface 322 is disposed proximate radial face 324. That is, blade 300 is inserted into input shaft bore 314 such that there is virtually no gap between surface 322 and face 324. In an example embodiment, surface 322 and face 324 are in contact.

Radial blade 308 includes axial width 326. As can best be seen in FIG. 7, axial width 326 is selected to minimize axial clearance 328 between distal end 330 of blade 300 and radial wall 332 of torque converter 304 when input shaft 302 is installed in a transmission (not shown) attached to an engine (not shown).

Figure 8:
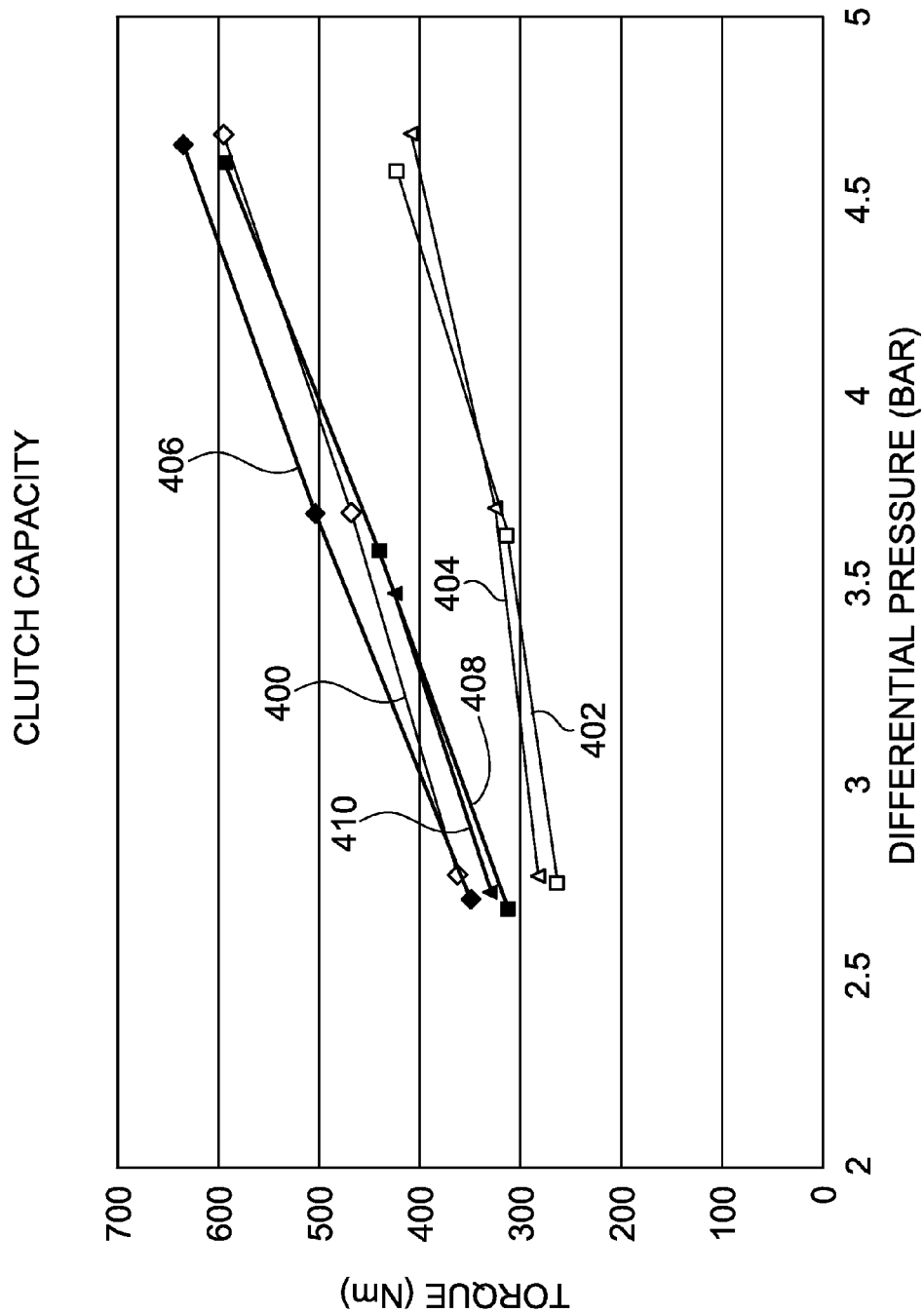
FIG. 8 is a graph of clutch capacity vs. pressure at various rotational speeds.

The following description is made with reference to FIG. 8. FIG. 8 is a graph of measured clutch capacity vs. pressure at various rotational speeds. Line 400 plots clutch capacity for clutch with a prior art input shaft assembly at 2000 RPM rotation speed. Lines 402 and 404 plot clutch capacity for a clutch with a prior art input shaft assembly at 5000 RPM and 6000 RPM, respectively. Note that clutch capacity for lines 402 and 404 is significantly less than clutch capacity for line 400. For example, at approximately 2.75 bar pressure, line 400 indicates capacity of approximately 360 Nm at 2000 RPM, but line 402 shows only about 260 Nm at 5000 RPM and line 404 shows about 280 Nm at 6000 RPM.

Blade 300 slows rotation of fluid to a rotational speed comparable to rotational speed of input shaft 302. Slower rotational speed allows easier entry of fluid into bore 314 through space 317 between circumferential wall 315 and blade 300, reducing back pressure. Lines 406, 408, and 410 plot clutch capacity for a clutch with an inventive input shaft assembly at 2000 RPM, 5000 RPM, and 6000 RPM, respectively. Note that clutch capacity for all three speeds is similar with the inventive input shaft. For example, at about 2.75 bar pressure, line 406 indicates capacity of about 350 Nm, line 408 indicates capacity of about 330 Nm and line 410 indicates capacity of about 310 Nm. Overall, lines 408 and 410 are significantly higher than lines 402 and 404 for the same pressure input.

Of course, changes and modifications to the above examples should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

We claim:

1. An input shaft assembly for a vehicle transmission comprising:
    an input shaft with a cylindrical portion including, a center bore and a distal end; and,
    a flat blade having a planar body portion disposed in the center bore and a pair of radial blade segments, coplanar with the body portion, proximate the distal end, and extending in radially opposite directions beyond the center bore.

2. The input shaft assembly of claim 1 wherein the radial segments are in contact with the distal end.

3. The input shaft assembly of claim 1 wherein the center bore includes an inner circumferential surface, the input shaft assembly further comprising at least one space between the body portion and the inner circumferential surface.

4. The input shaft assembly of claim 1 wherein the body portion includes a substantially rectangular shape and is press-fitted into the center bore.

5. The input shaft assembly of claim 1 wherein the radial blade segments extend from the body portion.

6. The input shaft assembly of claim 1 wherein the radial blade segments are each substantially rectangular in shape and include a radial surface.

7. The input shaft assembly of claim 6 further comprising a radial face at the distal end of the cylindrical portion, wherein the radial surfaces are disposed proximate the radial face.

8. The input shaft assembly of claim 1 wherein:
    the flat blade includes a distal end;
    the radial blade segments each include an axial width; and,
    the axial widths are selected to minimize an axial clearance between the distal end of the blade and a radial wall of a torque converter when the input shaft is installed in a transmission attached to an engine.

9. The input shaft assembly of claim 1 wherein:
    each radial blade segment includes a distal end disposed opposite the distal end of the input shaft; and,
    axial widths of the radial blade segments are selected to minimize an axial clearance between the blade segment distal ends and a radial wall of a torque converter.

* * * * *